United States Patent

[15] 3,704,821

Loyd et al.

[45] Dec. 5, 1972

[54] PORTABLE FRICTION WELDING MACHINE

[72] Inventors: Calvin D. Loyd, Peoria; Theodore L. Oberle, Washington; Ronald L. Satzler, Metamora, all of Ill.

[73] Assignee: Caterpillar Tractor Co., Peoria, Ill.

[22] Filed: Oct. 28, 1970

[21] Appl. No.: 84,746

[52] U.S. Cl. ............................228/2, 29/470.3
[51] Int. Cl. ...................................B23k 27/00
[58] Field of Search .....228/2; 29/470.3; 156/73, 480

[56] References Cited

UNITED STATES PATENTS

| | | | |
|---|---|---|---|
| 3,536,242 | 10/1970 | Gordon et al. | 228/2 |
| 3,439,853 | 4/1969 | Deemie et al. | 228/2 |
| 3,235,157 | 2/1966 | Hollander | 228/2 |
| 3,599,857 | 8/1971 | Loyd et al. | 228/2 |
| 3,234,644 | 2/1966 | Hollander | 228/2 X |

Primary Examiner—John F. Campbell
Assistant Examiner—R. J. Craig
Attorney—Fryer, Tjensvold, Feix, Phillips & Lempio

[57] ABSTRACT

A portable friction welding machine is provided with a pair of ram mechanisms which provide the necessary axial pressure during a welding operation and also operate to move a spindle of the welding machine to a position where the spindle may be pivoted outside the main machine body so that flywheels may be easily attached or removed from the spindle. The machine is also provided with an automatic disconnect mechanism between the drive motor and the spindle which disconnects the motor from the spindle upon the application of welding pressure through the rams.

11 Claims, 5 Drawing Figures

3,704,821

PORTABLE FRICTION WELDING MACHINE

BACKGROUND OF THE INVENTION

This invention relates to friction welding of the general type wherein two workpieces are subjected to relative rotation while in rubbing contact with each other to generate friction heat to raise the workpieces to suitable welding temperature, whereupon the relative rotation subsides and a bond is formed between the workpieces.

It is also to be understood that the invention is applicable to the inertia friction welding process. In the inertia welding process the energy required to bring the common interface of the workpieces to a bondable condition is stored as kinetic energy in rotating inertia weights. These weights generally take the form of flywheels that are connected to one of the workpieces and the entire energy necessary to form the bond is stored in the weights prior to the engagement of the workpieces at the interface. The stored energy is discharged into the interface through frictional heating and plastic working developed at the interface as the rubbing contact slows the rotating weights and the bonding cycle is concluded.

More specifically, the present invention is directed to a portable friction welding machine of a light and compact design which can easily be transported to desired welding locations.

One of the principal objects of the present invention is the provision of two parallel hydraulic rams which provide hydraulic pressure needed for welding and also provide a means for moving the spindle assembly of the machine to a position where the spindle assembly may be separated from the drive motor and pivoted to a position outside the machine so that flywheels may be added or removed from the spindle.

A further object of the invention is the provision of a disconnect mechanism which serves to automatically separate the drive shaft of the motor from the spindle upon application of welding pressure through the ram mechanisms.

Still another object of this invention is the provision of electromagnetic means for fastening the machine in a fixed position prior to a welding operation.

Other and further objects and advantages of the present invention will be apparent from the following description and claims and are illustrated in the accompanying drawings, which, by way of illustration, show preferred embodiments of the present invention and the principles thereof and what are now considered to be the best modes contemplated for applying these principles. Other embodiments of the invention utilizing the same or equivalent principles may be used and structural changes may be made as desired by those skilled in the art without departing from the present invention and the purview of the appended claims.

DETAILED DESCRIPTION OF THE PREFERRED EMBODIMENT

Figure 1:
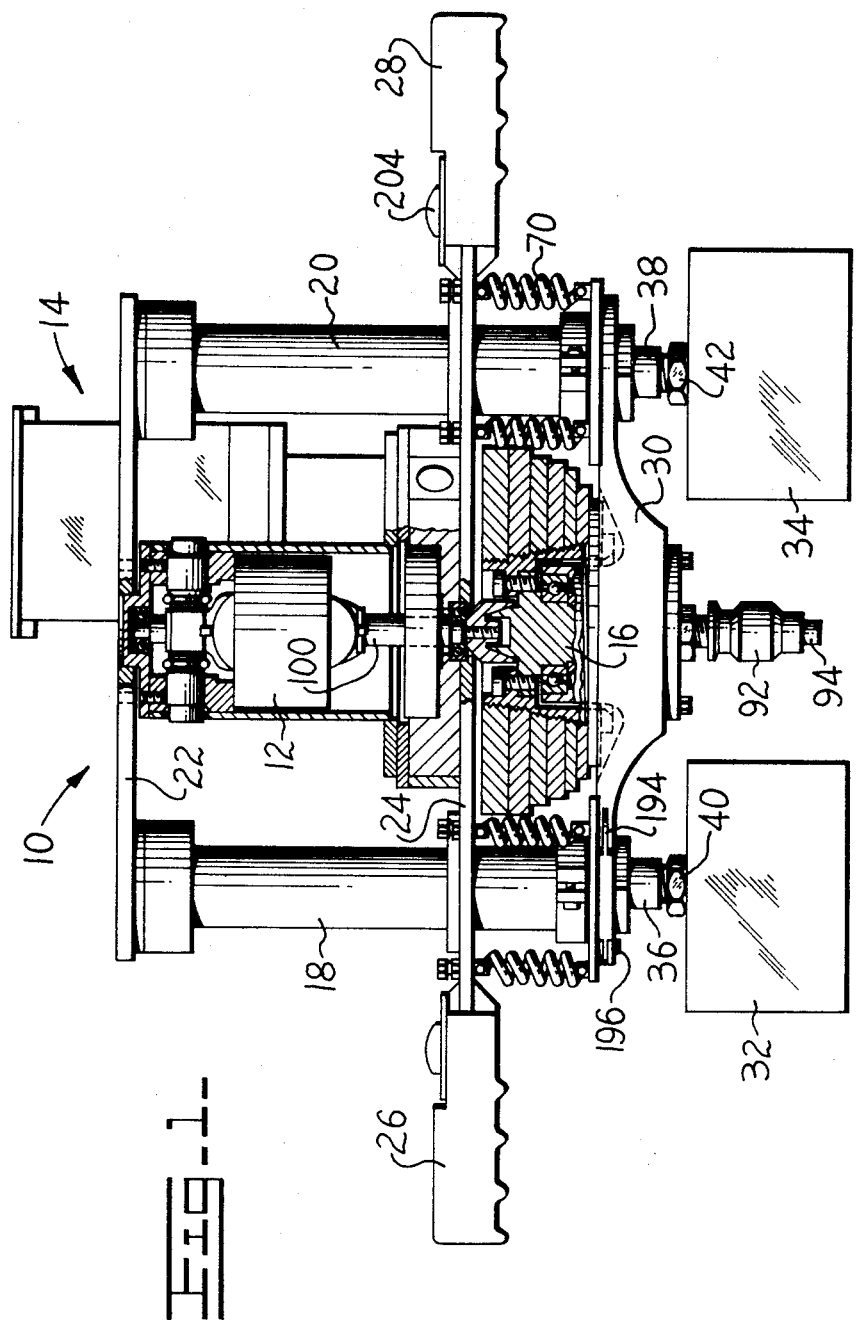
FIG. 1 is a longitudinal view, partially in section, illustrating one embodiment of the portable friction welding machine of the present invention.

Referring now to FIG. 1, one embodiment of the portable friction welding machine of the present invention is shown generally at 10. Some of the major elements of the machine comprise an electric drive assembly 12, a hydraulic power assembly 14, a spindle and flywheel assembly 16, two hydraulic ram assemblies 18 and 20, a top plate 22, a middle plate 24 having handles 26 and 28 attached thereto, a spindle support casting 30, and two electromagnets 32 and 34 to which the entire machine 10 is fastened by means of hydraulic cylinder rods 36 and 38. The cylinder rods 36 and 38 are threadably connected to the electromagnets 32 and 34, respectively, and are locked rigidly thereto by jam-nuts 40 and 42.

Figure 2:
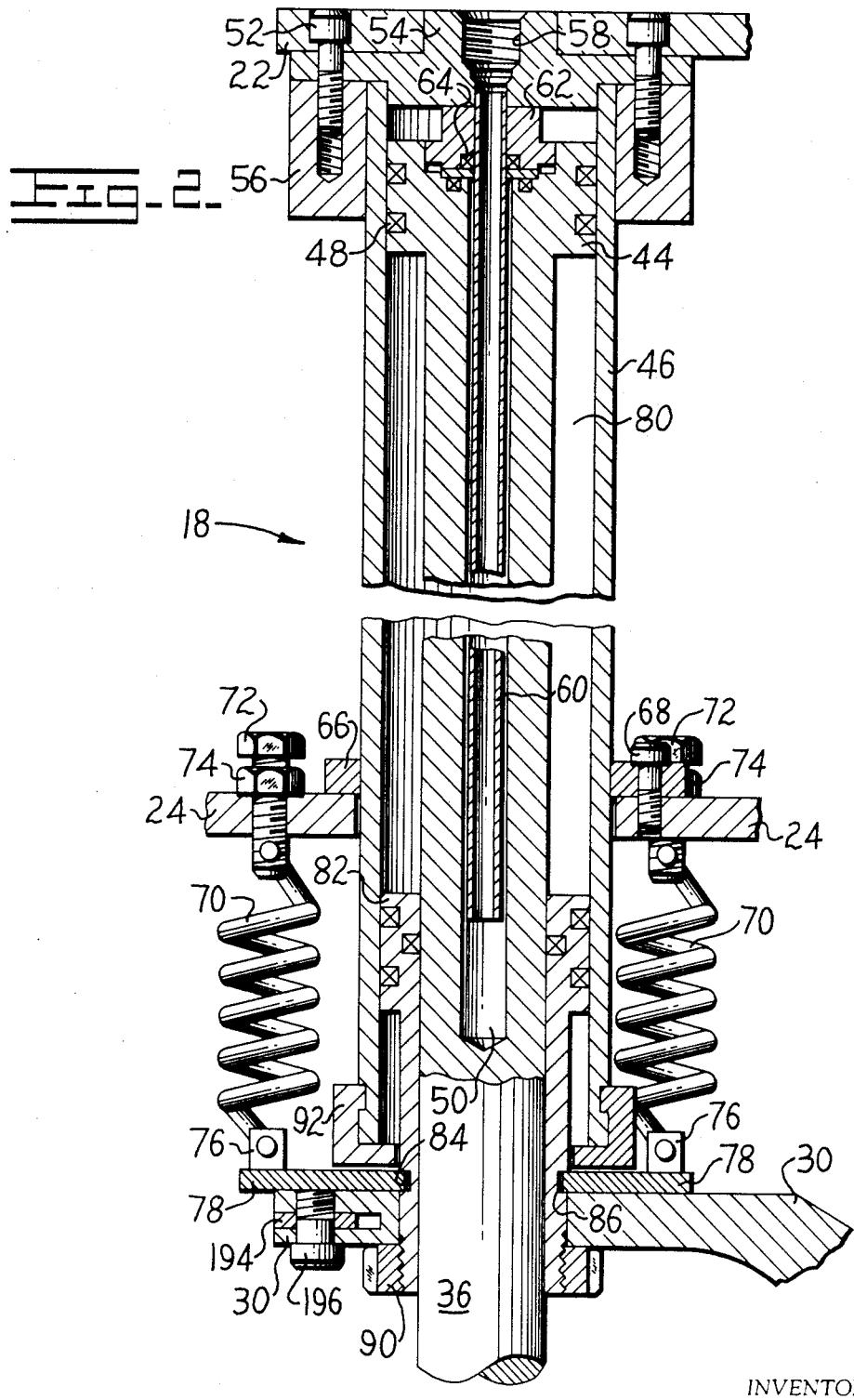
FIG. 2 is a longitudinal sectional view illustrating the details of one of the ram mechanisms of the present invention.

Turning to FIG. 2 in conjunction with FIG. 1, the hydraulic ram assembly 18 will now be described; it being understood that the hydraulic ram assembly 20 is of identical construction. Extending upwardly from the electromagnet 32 is a rod 36 which has an enlarged upper end 44 received inside a cylinder 46. Suitable sealing elements 48 are provided on the enlarged portion 44 of the rod so that the cylinder 46 may move upwardly and downwardly about the enlarged portion of the rod at certain times during operation of the machine. The rod 36 is also provided with an elongated bore 50.

The top plate 22 of the machine is provided with a plurality of cap screws 52 which pass through the plate and a cap member shown at 54 and screw into a ring-like element 56 which is welded to the outer surface of the cylinder 46. Consequently, the cylinder 46 is tightly secured to the plate 22 and the cap 54. The cap 54 is provided with a bore 58 and a tube 60 is welded inside the bore 58 and extends downwardly into the bore 50 of the rod 36. The top portion 44 of the rod 36 is provided with a cap 62 which has suitable sealing elements 64 to ensure a sliding fluidtight seal between the tube 60 and the upper part of the bore 50 of the rod 36.

An annular ring plate 66 is welded to the outside of cylinder 46. The ring plate 66 is in turn bolted to the middle plate 24 by means of several cap screws 68. Equally spaced around the circumference of each of the ram assemblies 18 and 20 are a plurality (preferably three) of springs 70 which are fastened to the middle plate 24 by means of bolts 72 which are held in place by lock nuts 74. The lower ends of the springs 70 are fastened to a bracket 76 which is in turn welded to a plate 78.

The cylinder 46 is provided with an expansible chamber 80 which is defined by the inner wall of the cylinder, the outer wall of the rod 36, the enlarged portion 44 of the rod and a movable piston member 82. The plate 78 is fastened to the outer periphery of the piston 82 by means of a groove 84 formed on the circumference of the piston. A U-shaped slot 86 is machined into the plate 78 and allows the plate to slide into the groove 84 of the piston 82. The springs 70 are thus fastened to both the middle plate 24 and the plate 78 which in turn is fastened to the piston 82 to thereby normally bias the piston 82 upwardly into the chamber 80 to the position shown. Tension on the springs 70 can be adjusted by manipulating the bolt elements 72 in or out of the middle plate 24.

The spindle casting 30 is fastened to the piston 82 for movement therewith by means of a nut 90 which screws onto the outside diameter of the piston and tightens the spindle casting against plate 78. A circular split clamps 92 serves as a bottom for the cylinder 46 and also as a stop for the piston 82 when it is moved downwardly to the bottom of its travel.

Referring back to FIG. 1, it will be noted that the spindle casting 30 has associated therewith a rotatable chuck 92 for holding a workpiece 94 during a welding operation. During a welding operation hydraulic fluid under pressure is supplied to the chamber 80 which overcomes the bias of springs 70 and causes the piston 82 to move downwardly. This in turn causes the spindle casting 30 and the rotating chuck 92 and workpiece 94 to also move downwardly. In this manner the rotating workpiece 94 may be brought into contact with a plate to which the electromagnets 32 and 34 are fastened and the workpiece 94, which might take the form of a stud, is welded to the plate.

Figure 3:
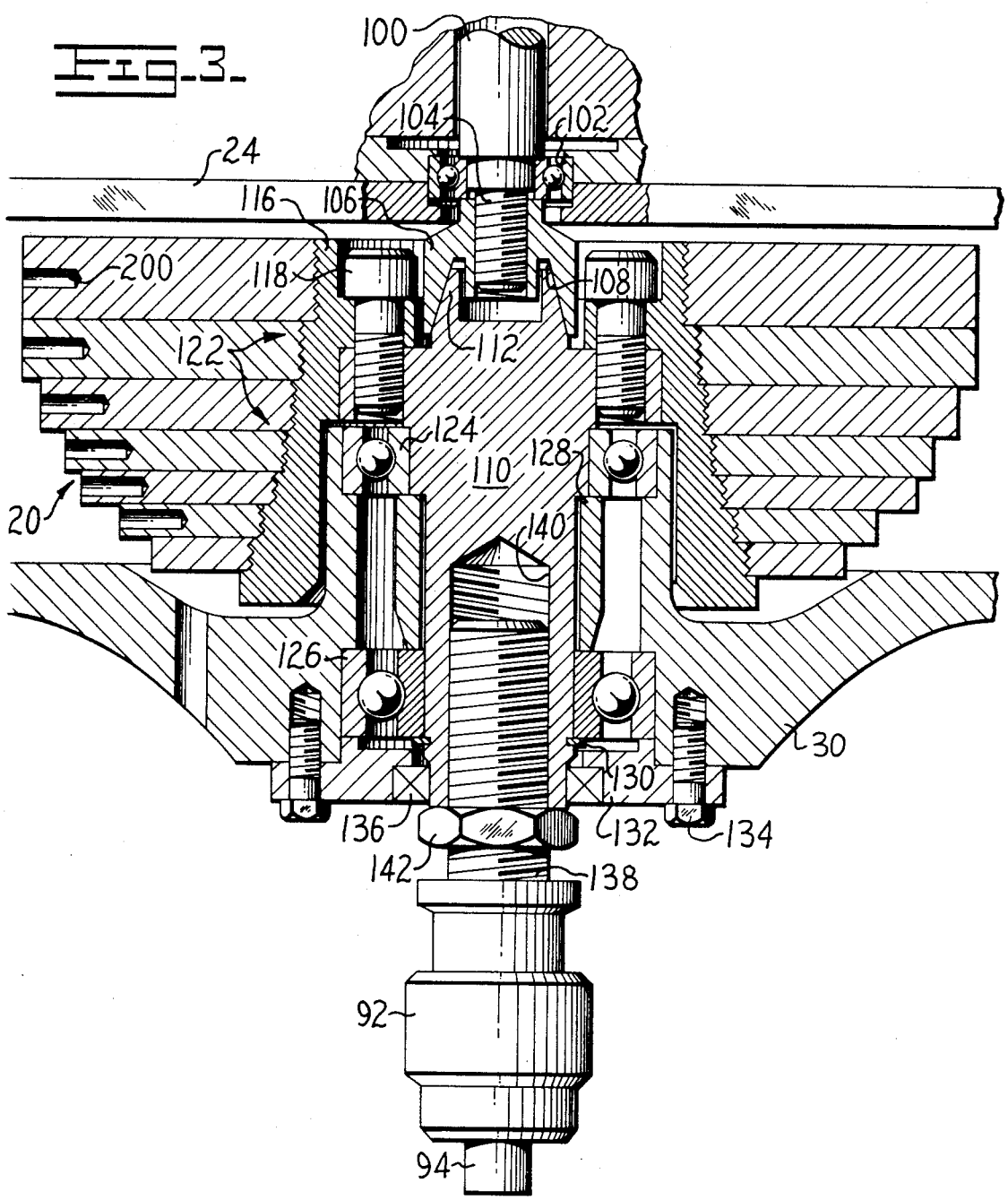
FIG. 3 is a longitudinal view, substantially in section, illustrating the details of the spindle and flywheel arrangement of the present invention.

Referring to FIG. 3 in conjunction with FIG. 1, a shaft 100 extends out of the electric motor 12 through a bearing assembly 102 associated with the middle plate 24 and is provided with a threaded end 104 on which a cup member 106 is attached. The inner portion of the cup 106 is provided with an annular tapered surface 108. The main spindle of the machine is shown at 110 and at one end is provided with a tapered cone 112 which is machined to mate with the tapered cup member 106.

A flywheel adaptor 116 is fastened to the spindle 110 by means of cap screws 118. A plurality of flywheels 120 are screwed onto threaded steps 122 formed on the outer circumference of the adaptor 116.

Bearing assemblies 124 and 126 rotatably support the spindle 110 within the spindle casting 30. The bearing assemblies 124 and 126 are held in their relative position by a spacer 128, snap spring 130 and cover plate 132. The cover plate 132 is fastened to the spindle casting 30 by means of cap screws 134. A seal assembly 136 is press-fitted between the cover plate 132 and the spindle 110 to keep dust and dirt away from the bearing assemblies 124 and 126.

A threaded shaft 138 on the chuck assembly 92 screws into a threaded cavity 140 of the spindle 110 to thereby attach the chuck assembly 92 to the spindle. The chuck assembly 92 may be adjusted longitudinally with respect to the spindle 110 by means of a nut 142.

It should be observed that when the spindle casting 30 and related parts, including the spindle 110, and all the fastened flywheels 120 are forced downwardly by activation of the hydraulic pistons 82 located inside the hydraulic cylinder assemblies 18 and 20, the cone 112 will separate from the cup 106 thereby allowing the spindle and flywheels to freewheel during the welding operation. Thus, during the welding operation, the motor shaft 100 and the spindle 110 are not connected.

Figure 4:
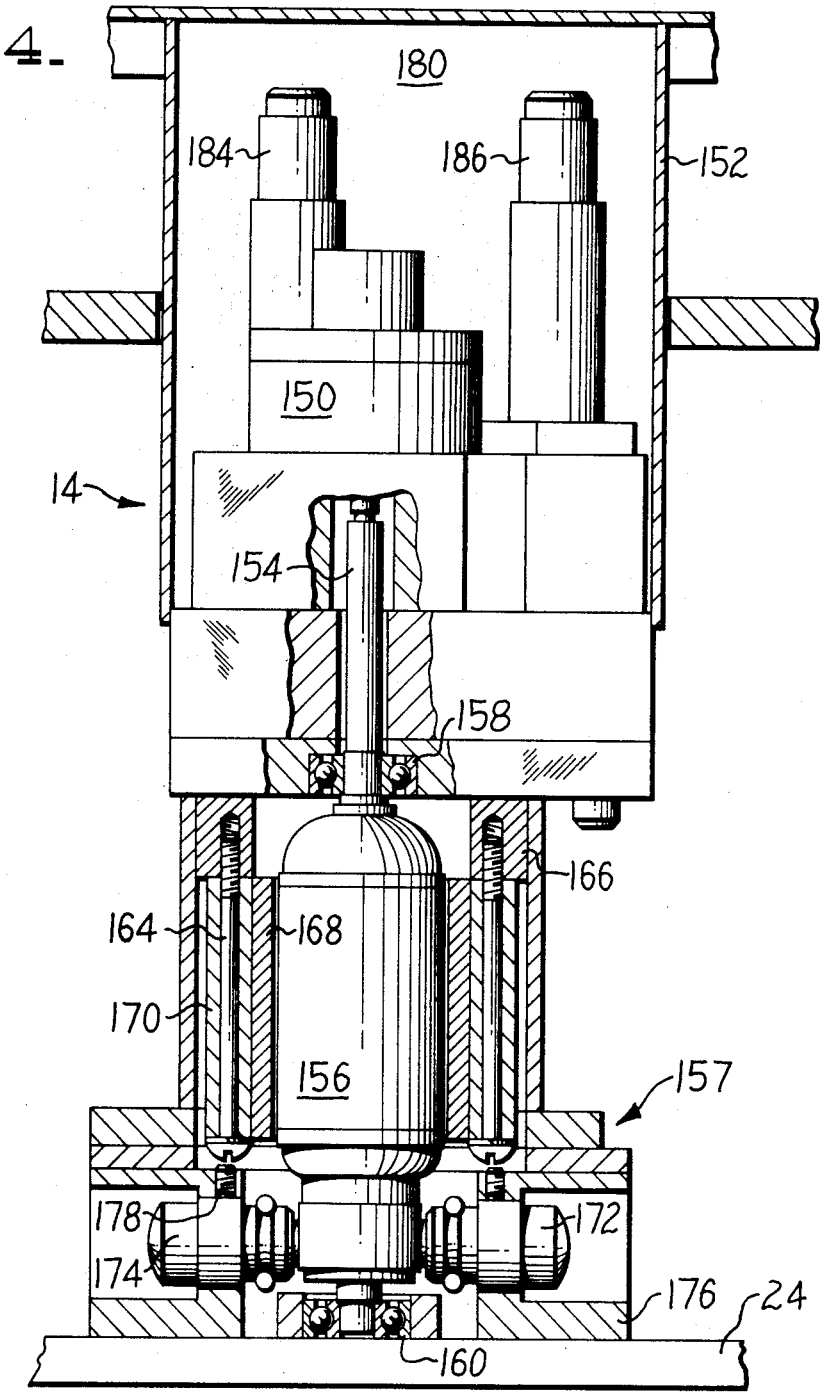
FIG. 4 is a longitudinal view, partially in section, illustrating the main components of a hydraulic power unit for the present invention.

FIG. 4 illustrates the main components of the hydraulic power assembly 14. As shown, a hydraulic pump assembly is situated inside a housing 152. A rotating portion of the pump 150 is connected to an output shaft 154 which is connected to the armature 156 of a second electric motor 157. The armature 156 is supported for rotation by bearing assemblies 158 and 160. Screw elements 164 are threaded into a ring 166 to hold a motor stator 168 and motor housing 170 in place. Brush holder assemblies 172 and 174 are received in a frame member 176 where they are held in place by means of set screws 178.

A chamber 180 is formed inside the housing 152 and is filled with hydraulic fluid which is pressurized by the pump assembly 150. It should be understood that the pump assembly 150 is situated inside the fluid filled chamber 180 and is submerged in the hydraulic fluid. Pressure relief valves 184 and 186 prevent the hydraulic fluid in the chamber 180 from being pressurized beyond a predetermined safe level.

The entire hydraulic power assembly 14 may be fastened to the middle plate 24 of the welding machine by any suitable means. The function of the hydraulic power assembly 14 is to provide fluid under pressure to various machine components such as the hydraulic cylinder assemblies 18 and 20. The hydraulic lines and connections between the pump 150 and the various fluid operated machine components are not shown in the drawings.

Figure 5:
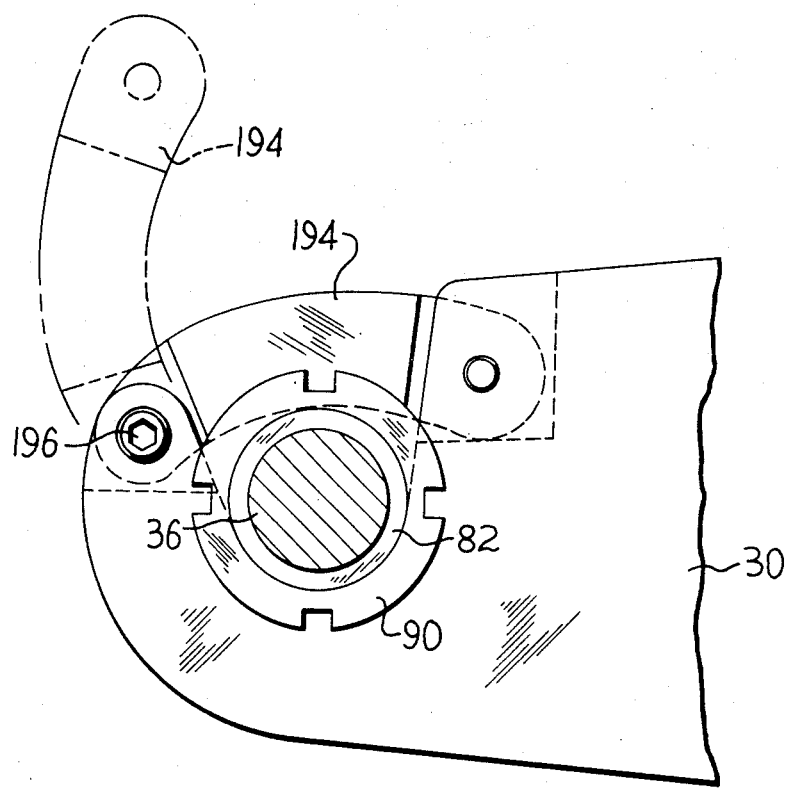
FIG. 5 is a detailed view illustrating the operation of a latch mechanism associated with the spindle assembly of the present invention.

An important feature of the machine is the manner in which flywheels 120 may be added to or removed from the spindle assembly 110. Referring to FIG. 5 in conjunction with FIGS. 1 and 2 it will be observed that a lock member 194 is pivotally connected at 196 to the spindle casting 30. The lock member 194 normally secures the spindle casting 30 about the rod 36 as shown in full line in FIG. 5. However, as shown in phantom line in FIG. 5, the lock member 194 may be unfastened and swung outwardly. When the lock member 194 is unfastened the entire spindle casting 30 with the related spindle and chucking components attached thereto may be pivotally swung around the rod 38 to a position outside of the machine where flywheels may be added or removed.

The sequence for operating the machine to add or remove flywheels will now be described. The electric motor 157 drives the hydraulic power assembly 14 to provide pressurized fluid which is directed through tubes 60 in the ram assemblies 18 and 20 to the cavities 50 formed in the rods 36 and 38.

As the pressure rises in the cavity 50, an upward force is exerted on the bottom face of tube 60. Since the tube 60 is fastened to the cap 54 which in turn is fastened to the plate 22 and the ring plate 56, the upward force exerted on the tube 60 causes the entire cylinder assemblies 18 and 20 and connected components, except for the rods 36 and 38, to move upwardly. The rods 36 and 38 do not move upwardly because they are fastened to the electromagnets 32 and 34 which in turn are activated to attach the entire machine 10 to a plate member (not shown).

The machine is moved upwardly until the chuck assembly 92 is higher than the top of the electromagnets 32 and 34. The nuts 90 are then loosened to that the spindle casting 30 is no longer in contact with plate 78. Fluid under pressure is then directed to the chamber 80 which forces the piston 82 and related components including the spindle casting 30, spindle 110 and all connected flywheels in a downward direction thereby separating the cone 112 from the cup 106.

With the cone and cup separated, there is no longer any connection between the components affixed to the spindle casting 30 and the other portions of the machine. At this time, the lock member 194 (see FIG. 5) is unfastened and swung to an open position. The entire spindle casting 30 having the spindle 110 and attached flywheels 120 is provided about the rod 38 to a position outside of the machine so that these elements are no longer underneath the motor assembly 12.

Flywheels 120 may now be added or removed as desired. If flywheels are to be added they can simply be placed on the flywheel adaptor 116 by hand and screwed on until the bottom face of the added flywheel comes into contact with the top face of the flywheel immediately below. Openings 200 are provided in the outer circumference of the flywheels 120 to allow a spanner wrench to be placed in the hole 200 so that the flywheels can be tightened.

Once the proper number of flywheels have been attached to the flywheel adaptor 116, the entire spindle casting assembly 30 is pivoted about rod 38 back into position beneath the motor assembly 12. The lock member 194 is then reclamped about the rod 36 and the nuts 90 are retightened to bring the spindle casting 30 into contact with the plate 78.

Pressurized fluid is then drained from the chamber 80 and the springs 70 function to move the piston 82 and other components including the spindle casting 30 upwardly until the cone 112 and cup 106 come into contact. Pressurized fluid is then drained from the cavity 50 of the rod 36 and the entire machine again moves downwardly on the rods 36 and 38. This downward movement stops when the plug 62 of the upper rod portion 44 comes into contact with the cap 54 associated with the plate 22.

In order to carry out a specific welding operation the entire machine 10 is carried to the location where the welds are to be made. The machine is then positioned over the spot where the welding is to be performed and the electromagnets 32 and 34 are activated to effectively fasten the entire machine to a weld plate (not shown) located directly beneath the electromagnets as viewed in FIG. 1. A workpiece 94, such as a stud, is then inserted into the chuck assembly 92 and the chuck is tightened.

With the proper number of flywheels attached to the spindle 110, the electric motor 12 is activated and the spindle and workpiece 94 are accelerated to the desired welding speed. When the rotating spindle and flywheels have reached the welding velocity a switch 204 located on the handle 28 is operated and causes the ram assemblies 18 and 20 to be activated by pressurized hydraulic fluid. The pressurized fluid flows into the expansible chamber 80 and forces the piston 82 downwardly. Since the piston 82 is attached to the spindle casting 30, the spindle casting and related components (including the spindle 110 and attached flywheels 120) are also forced downwardly. This downward movement causes separation of the spindle cone 112 from the cup-shaped element 106 of the motor drive shaft 100.

Once the cone and cup have separated, the motor 12 is no longer being used to drive the spindle 110 and the spindle flywheels. As the spindle casting, spindle assembly and flywheel move downwardly, the workpiece 94 comes into contact with the weld plate held to the machine by electromagnets 32 and 34. The frictional heat generated by the rotation and the applied hydraulic pressure on the pistons 82 causes the workpiece 94 to weld to the plate as the energy in the rotating components of the machine is used up and these components come to a stop.

The chuck assembly 92 is then loosened and pressure fluid is drained from the expansible chamber 80. At this time there is no pressure being applied to the top of piston 82 and the springs 70 which have been extended cause the entire spindle casting 30 and related components to be moved upwardly to their original position. This upward movement continues until the cone 112 and the cup 106 come into contact.

As the components of the machine move upwardly the workpiece 94 is pulled out of the chuck since it is now welded to the plate. The electromagnets 32 and 34 are then deactivated and the machine may be repositioned in a new welding area.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A portable friction welding machine comprising a free member; motor means attached to the frame member; a pair of ram mechanisms attached to the frame member on each side of the motor means; said ram mechanisms having outer ends provided with means for fixedly attaching the machine in a desired location; a rotatable spindle attached to a movable portion of the ram mechanisms and releasably connected to the motor means; said rotatable spindle having a workpiece holding chuck associated therewith; said ram mechanisms having first cylinder and piston means for moving said frame member, motor and spindle as a unit upwardly relative to the outer ends of the rams, and second cylinder and piston means for moving said motor means relative to said spindle to disconnect said motor from said spindle and to thereby facilitate adding inertia weight to or removing inertia weight from the spindle.

2. A portable friction welding machine comprising a frame member; motor means attached to the frame member; a pair of ram mechanisms attached to the frame member on each side of the motor means; said ram mechanisms having outer ends provided with means for fixedly attaching the machine in a desired location; a rotatable spindle attached to a movable portion of the ram mechanisms and releasably connected to the motor means; said rotatable spindle having a workpiece holding chuck associated therewith; said ram mechanisms having first means for moving said frame member, motor and spindle relative to the outer ends of the rams, and second means for moving said motor means relative to said spindle to disconnect said motor from said spindle and wherein said rotatable spindle is provided with means for receiving a plurality of flywheels; said spindle having a pivotal connection to one of said ram mechanisms and releasable latch means connecting said spindle to the other of said ram mechanisms so that said latch means may be operated to disconnect the spindle from said other ram mechanism and said spindle may be pivoted about said one ram mechanism to a location outside the machine for the addition or removal of flywheels.

3. A portable friction welding machine comprising a rotatable spindle having a workpiece holding chuck thereon; motor means for driving said spindle; an inertia mass means operatively associated with said spindle; hydraulic ram means for moving said spindle longitudinally relative to the motor means; disconnect means for permitting said motor to become disconnected from said spindle when said ram means is operated to move said spindle away from said motor; and attachment means associated with said ram means for holding the welding machine in a fixed position during a welding operation, said ram means including one hydraulic ram for moving the motor means and spindle as a unit away from the attachment means to facilitate addition to or removals from the inertial mass and another hydraulic ram for applying the welding force.

4. A portable friction welding machine as set forth in claim 3 wherein said motor means comprises an electric motor.

5. A portable friction welding machine as set forth in claim 3 wherein said inertia mass means comprises annular flywheel means removably attached to the circumference of the spindle.

6. A portable friction welding machine as set forth in claim 3 wherein said disconnect means for permitting said motor to become disconnected from said spindle comprises a cup-shaped element associated with the shaft of the motor means and having an inner tapered surface, and a cone-shaped element associated with said spindle having a tapered outer surface adapted to mate with the tapered inner surface of said cup member.

7. A portable friction welding machine comprising a rotatable spindle having a workpiece holding chuck thereon; motor means for driving said spindle; and inertia mass means operatively associated with said spindle; hydraulic ram means for moving said spindle longitudinally relative to the motor means; disconnect means for permitting said motor to become disconnected from said spindle when said ram means is operated to move said spindle away from said motor; and attachment means associated with said ram means for holding the welding machine in a fixed position during the welding operation and wherein said attachment means comprises electromagnetic means.

8. A portable friction welding machine comprising a rotatable spindle having a workpiece holding chuck thereon; motor means for driving said spindle; an inertia mass means operatively associated with said spindle; hydraulic ram means for moving said spindle longitudinally relative to the motor means; disconnect means for permitting said motor to become disconnected from said spindle when said ram means is operated to move said spindle away from said motor; and attachment means associated with said ram means for holding the welding machine in a fixed position during a welding operation and wherein said machine further comprises a plate member having the motor means attached thereto and a pair of assemblies attached to the plate on each side of the motor; said assemblies comprising a cylinder having a first end attached to the plate, a rod member having a first end provided with an enlarged head slidably received in the cylinder; a second end of the rod extending from the second end of the cylinder; said attachment means being located at the second end of the rod; a piston slidably received in a first expansible chamber defined by the inner wall of the cylinder and the outer wall of said rod; one end of the piston extending from the second end of the cylinder; and means connecting the spindle assembly to the piston for longitudinal movement therewith.

9. A portable friction welding machine as set forth in claim 8 wherein biasing means are associated with said cylinder to normally bias the piston and associated spindle assembly to a predetermined position with respect to the cylinder.

10. A portable friction welding machine as set forth in claim 9 wherein said biasing means comprises a plurality of spring elements.

11. A portable friction welding machine as set forth in claim 8 and further comprising a longitudinal bore formed in the first end of said rod member; a tubular element attached to said plate member and extending into the longitudinal bore of said rod member to form a second expansible chamber inside said rod member; means for introducing pressurized fluid into the second expansible chamber to thereby cause said plate member and all machine components connected thereto to move longitudinally relative to said rod member.

* * * * *